(12) United States Patent
Corkran et al.

(10) Patent No.: US 7,412,757 B2
(45) Date of Patent: Aug. 19, 2008

(54) DOVE-TAIL SIZING STOCK WITH SOLDER POCKETS

(76) Inventors: Charles Edward Corkran, 2206 W. Hwy. 76, #18, Branson, MO (US) 65616; Leamon Cotton, Jr., 1440 State Hwy. 248, #Q196, Branson, MO (US) 65616; Thomas David Smith, 580 Abbey La., #7, Branson, MO (US) 65616

( * ) Notice: Subject to any disclaimer, the term of this patent is extended or adjusted under 35 U.S.C. 154(b) by 479 days.

(21) Appl. No.: 11/181,475

(22) Filed: Jul. 15, 2005

(65) Prior Publication Data

US 2006/0032893 A1    Feb. 16, 2006

Related U.S. Application Data

(60) Provisional application No. 60/601,032, filed on Aug. 13, 2004.

(51) Int. Cl.
*B23P 13/00* (2006.01)
*B23K 1/19* (2006.01)

(52) U.S. Cl. .............. 29/8; 29/896.412; 63/15; 63/15.2; 219/606

(58) Field of Classification Search ............... 277/434; 228/174; 409/242; 29/8; 63/15
See application file for complete search history.

(56) References Cited

U.S. PATENT DOCUMENTS 3,127,757 A * 4/1964 Weiss .................... 63/15.7
5,590,450 A * 1/1997 March ........................ 29/8

* cited by examiner

*Primary Examiner*—Jerry Lorengo
*Assistant Examiner*—Erin P Barry
(74) *Attorney, Agent, or Firm*—Richard L. Marsh

(57) ABSTRACT

The Dove-Tail Sizing Stock with Solder Pockets includes the technique of increasing or reducing the size of a circular object, such as a finger ring. The sizing stock includes dove-tail shaped ends with pockets of solder on each end. The solder that is inserted into the holes drilled into the dove-tail crevices on each end of the sizing stock is of the same color, karat and hardness as the sizing stock. The sizing stock will be of the same material, color, karat and hardness as the circular object or finger ring to be sized.

It will be understood that the foregoing description is for illustration purposes only. Other adaptations and uses of the invention may be made without departing from the spirit and scope of the invention as set forth in the appended claims.

11 Claims, 2 Drawing Sheets

FIG. A
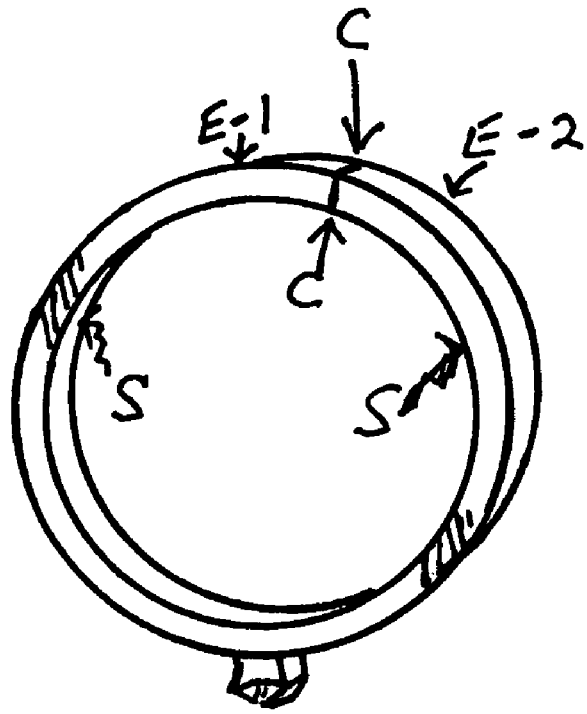
FIG. B
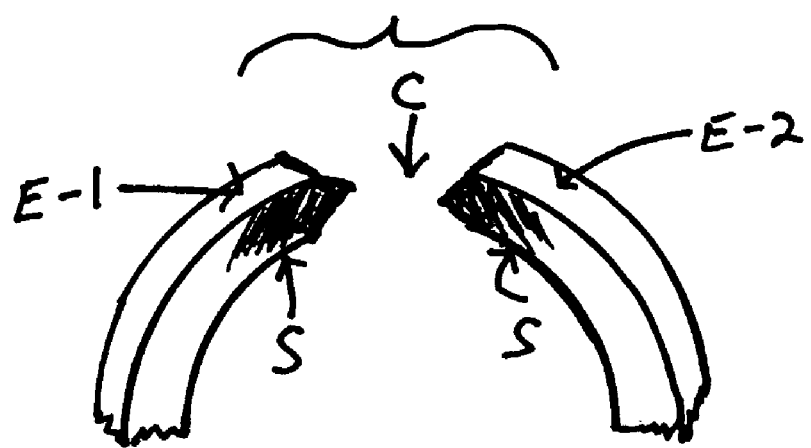

FIG. C
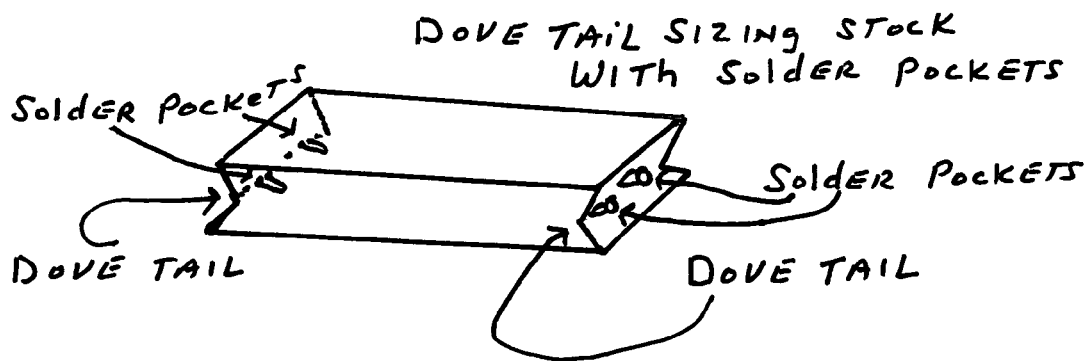
FIG. D
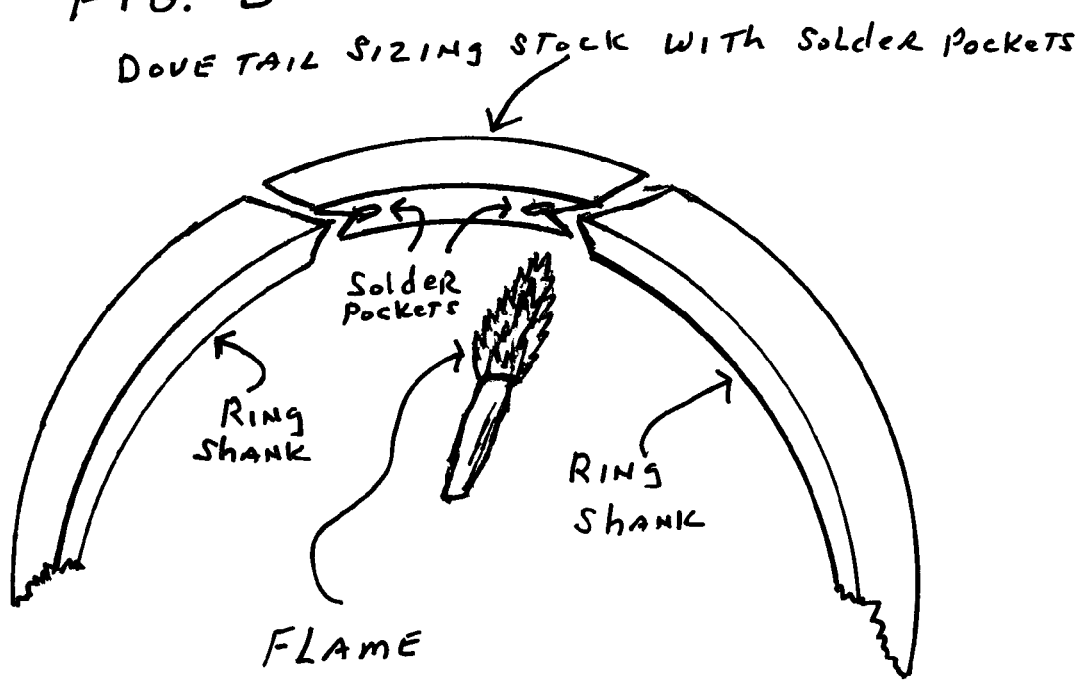

DOVE-TAIL SIZING STOCK WITH SOLDER POCKETS

This non-provisional application claims priority to the provisional patent application Ser. No. 60/601,032—Filing date Aug. 13, 2004

This invention relates generally to sizing stock and more particularly, to dove-tail sizing stock with solder pockets which provide a strong joint and an easy technique for increasing, or reducing the size of circular objects such as finger rings.

BACKGROUND OF THE INVENTION

In the Jewelry industry, customers require finger rings to be increased, or reduced in size. This need can be predicated on one receiving a ring as a gift that needs to be resized to fit the recipient, or simply due to the change in ones finger size. If a ring is cut to be sized it must be rejoined. It is common practice to cut the bottom of the ring shank and insert sizing stock of the same material as the ring. An attempt is then made to solder the insert in place.

There are two common joints used in this procedure, the Butt joint and the Dove-tail joint. The butt joint is formed when the shank is cut flat on the ends and brought together to form a tight seam or joint. The dove-tail joint is formed by making a dove-tail shaped cut in the sizing stock and shaping the cut ends of the joint into a "V" shape to match the dovetail.

Several methods have been proposed in the craft for increasing ring size. Although assumed effective for their intended purposes, methods such as the Butt joint shown in U.S. Pat. No. 5,590,450 must be used in conjunction with a device that holds the ring shank, as well as a devise that will hold the sizing stock, in a position to assure proper alignment. An attempt is then made to solder the insert in place. Because the workspace is crowded with holding devices, it is often difficult to place the sizing stock appropriately, and even when correctly placed; the stock may slip during the soldering procedure, thus resulting in an item that either requires re-sizing or has a less than satisfactory appearance. In the Jewelry Industry aesthetics is a key factor. This method is tedious, time consuming and results in a much weaker joint. In this regard, a good jeweler will never use a butt joint.

Solder comes in various sizes, colors, karats and hardness. Jewelers will often pick up the wrong size, color, karat, or hardness. Sizing a 14 karat ring, for example, with 10 karat solder can be disastrous to a jeweler's reputation.

Therefore, it is desirable to have sizing stock of various sizes that will easily slide into the joint and hold itself without the need for multiple holding devices. Further, it is desirable to have sizing stock with solder pockets that produce a much stronger joint in a shorter period of time. Finally, it is desirable to have sizing stock of various sizes that is manufactured with solder of the correct size, color, karat and hardness already incorporated into the stock. In this regard it is faster to size, more efficient, aesthetically acceptable and the cost factor is preestablished.

SUMMARY OF THE INVENTION

The Dove-Tail Sizing Stock with Solder pockets according to the present invention is formed by making a dove-tail shaped cut in the sizing stock and shaping the cut ends of the joint into a "V" shape to match the dovetail. Additional uniqueness of the dove-tail sizing stock are the solder pockets. A hole is drilled in each end of the dove-tail and solder of the same color, karat and hardness is inserted. The Dove-Tail Sizing Stock with Solder Pockets will be of various sizes. A large ring, for example, will require sizing stock with several solder pockets. The solder inserted into the sizing stock will be of the same color, karat and hardness as the circular object or finger ring shank.

It is understood that while certain forms of this invention have been illustrated and described, it is not limited thereto except insofar as such limitations are included in the following claims and allowable functional equivalents thereof.

DESCRIPTION OF THE DRAWINGS

FIG. A is a perspective view of a ring shank (S) with the bottom prepared to be cut (C) and the ends (E-1 and E-2) prepared to be separated.

FIG. B is a perspective view of the ring shank (S) after it has been cut (C) and the ends (E-1 and E-2) separated and pulled apart. The cut ends (E-1 and E-2) of the ring shank (S) have also been formed into a "V" shape in preparation to receive the dove-tail sizing stock with solder pockets.

FIG. C is a perspective view of the dove-tail sizing stock with solder pockets. A dove-tail shape has been cut on each end of the sizing stock material and holes are drilled into the crevices. Solder of similar color, karat and hardness as the sizing stock is then inserted into the drilled holes.

FIG. D is a perspective view of the dove-tail joint comprised of the cut ring shank, the insertion of the dove-tail sizing stock with solder pockets and the application of heat to form solder flow, thus making an efficient, aesthetically appealing dove-tail joint.

Having thus described the invention, what is claimed as new and desired to be secured by Letters Patent is as follows:

1. A method of manufacture of Dove-tail sizing stock with solder pockets, is comprised of the following steps:
   a. Selecting similar material, of similar size of the object to be sized;
   b. Forming a dove-tail shaped cut into each end of said sizing stock;
   c. Drilling at least one hole in a crevice of said dove-tail shaped cut in said each end of said sizing stock
   d. Inserting solder of similar color, karat, and hardness as said sizing stock, into said hole drilled into each end of said sizing stock.

2. A manufacture method as in claim 1 wherein said crevice of said dove-tail shaped cut in each end has two holes drilled thereinto.

3. A manufacture method as in claim 2 wherein said holes in said crevice of said dove-tail shaped cut are disposed adjacent ends of said crevice.

4. A method as in claim 2 wherein said holes are disposed longitudinally along a longitudinal axis of said sizing stock into said crevice.

5. A method as in claim 2 wherein said holes are disposed into said crevice at an angle to a longitudinal axis of said sizing stock.

6. A method of manufacture of a dove-tail shape sizing stock comprises the steps of selecting material of similar kind and size of a closed ended object to be sized and forming a dove-tail shaped cut on each end of said sizing stock, said dove-tail shaped cut comprising a crevice in said ends of said sizing stock said crevice having solder disposed thereinto, wherein at least one hole is disposed longitudinally along a longitudinal axis of said sizing stock into said crevice.

7. A method as in claim 6 wherein said solder is preformed into said crevice.

8. A method as in claim 7 wherein said solder is adhered to said crevice and flowed into said hole by heating said ends of said sizing stock.

9. A method of manufacture of a dove-tail shape sizing stock comprises the steps of selecting material of similar kind and size of a closed ended object to be sized and forming a dove-tail shaped cut on each end of said sizing stock, said dove-tail shaped cut comprising a crevice in said ends of said sizing stock said crevice having solder disposed thereinto, wherein solder is disposed into a hole provided into said crevice at an angle to a longitudinal axis of said sizing stock.

10. A method as in claim 9 wherein said solder is pre-formed into said crevice.

11. A method as in claim 10 wherein said solder is adhered to said crevice and flowed into said hole by heating said ends of said sizing stock.

* * * * *

UNITED STATES PATENT AND TRADEMARK OFFICE
CERTIFICATE OF CORRECTION

| | |
|---|---|
| PATENT NO. | : 7,412,757 B2 |
| APPLICATION NO. | : 11/181475 |
| DATED | : August 19, 2008 |
| INVENTOR(S) | : Charles Edward Corkran |

Page 1 of 1

It is certified that error appears in the above-identified patent and that said Letters Patent is hereby corrected as shown below:

Title Page, Item (76) Inventors should read --Charles Edward Corkran, Branson, MO (US)--.

Signed and Sealed this

Twenty-sixth Day of October, 2010

David J. Kappos
*Director of the United States Patent and Trademark Office*